United States Patent [19]

Soderberg et al.

[11] Patent Number: 4,739,486

[45] Date of Patent: Apr. 19, 1988

[54] MODIFYING A FIRMWARE VARIABLE IN AN ELECTRONIC POSTAGE METER

[75] Inventors: John H. Soderberg, Stratford; Edward C. Duwel, Trumbull, both of Conn.

[73] Assignee: Pitney Bowes Inc., Stamford, Conn.

[21] Appl. No.: 729,395

[22] Filed: May 1, 1985

Related U.S. Application Data

[63] Continuation-in-part of Ser. No. 447,912, Dec. 8, 1982, abandoned.

[51] Int. Cl.[4] .......... G06F 15/20; G06F 15/30; G06F 3/00

[52] U.S. Cl. .......... 364/464; 364/466; 364/200; 364/900

[58] Field of Search ... 364/200 MS File, 900 MS File, 364/464, 466, 567

[56] References Cited

U.S. PATENT DOCUMENTS

| | | | |
|---|---|---|---|
| 4,254,462 | 3/1981 | Raymond et al. | 364/200 |
| 4,400,778 | 8/1983 | Vivian et al. | 364/200 |
| 4,422,148 | 12/1983 | Soderberg et al. | 364/900 |
| 4,535,419 | 8/1985 | Dlugos et al. | 364/466 |
| 4,566,106 | 1/1986 | Check, Jr. | 371/21 |
| 4,595,984 | 6/1986 | Daniels | 364/466 |

*Primary Examiner*—Felix D. Gruber
*Assistant Examiner*—Danielle Laibowitz
*Attorney, Agent, or Firm*—Michael J. DeSha; David E. Pitchenik; Melvin J. Scolnick

[57] ABSTRACT

A method and associated apparatus for modifying a firmware variable in an electronic postage meter, comprising the steps of storing a program for operation of the electronic postage meter, a resident memory containing firmware variables, a communication means in the stored program which allows external data to be entered in the program to change the firmware variable in accordance with the external data.

12 Claims, 4 Drawing Sheets

MODIFYING A FIRMWARE VARIABLE IN AN ELECTRONIC POSTAGE METER

CROSS REFERENCE TO RELATED APPLICATIONS

This application is a continuation-in-part of U.S. application Ser. No. 447,912 filed on Dec. 8, 1982 and now abandoned.

The present application is related to copending application Ser. No. 447,815, filed on Dec. 8, 1982 now U.S. Pat. No. 4,579,054 in the name of Danilo Buan et al, entitled STAND-ALONE ELECTRONIC MAILING MACHINE, which describes a postage meter within which the present invention may be utilized.

Further, copending patent application Ser. No. 447,925 filed on Dec. 12, 1982 now U.S. Pat. No. 4,636,957 in the names of John H. Soderberg and Edward C. Duwel, entitled, CONTROLLING FIRMWARE BRANCH POINTS IN AN ELECTRONIC POSTAGE METER, discloses the use of a firmware variable to select a branch of the program.

BACKGROUND OF THE INVENTION

The present invention relates to electronic postage meters, and more particularly to electronic postage meters operating under control of a program and including nonvolatile memories (NVMs), such as the type disclosed in the aforementioned related patent applications.

Known electronic postage meters employing firmware such as disclosed in U.S. Pat. No. 4,301,507, issued on Nov. 17, 1981, and assigned to Pitney Bowes, Inc. of Stamford, Conn. are programmed via ROMs to undergo a certain sequence of operations. Such arrangement is adequate for use with a particular postal system such as that presently employed in the United States. However, for an electronic postage meter to be capable of international usage; where the requirements of the postal systems of the various countries vary widely, the number of individual programs or software packages required to accommodate such variations would increase the programming costs significantly.

Thus, it is clear that in a postage meter such as that disclosed in the above-mentioned patent, upon assembly will have certain information within it, that identifies it with a particular postage meter. Dependent upon the country that the meter is to be utilized in, there may also be certain firmware variables or parameters such as the number of decimal places, the contents of the ascending register or descending register, the batch count or the piece count information that must be satisfied to to in accordance with postal regulations of that particular country. Accordingly, a particular meter is generally produced for each of the countries, that has a particular software or firmware instruction set within it that provides parameters for that particular postage meter. However, producing postage meters in this way would require a large inventory of postage meters in each country that the meter is to be used. The cost of the meters utilized in each country would be correspondingly more expensive due to large inventory requirements.

Thus, what is needed is a method and apparatus for allowing for the change of certain firmware variables or parameters within the postage meters to allow for a modularity of the meter and would also allow the meter to be adapted to different types of postal regulations.

The meter must also have the capability of being adaptable with existing mailing equipment and also provide the same enhanced security measures that it utilized in existing postage meters.

SUMMARY OF THE INVENTION

It is an object of the present invention to provide a programmed electronic postage meter in which a variable in the program is modified to satisfy the requirements of a variety of different postal systems.

It is a further object of the present invention to provide an electronic postage meter having the same firmware for use with different postal systems.

This inventive embodiment concerns the ability to change the firmware variable after meter is assembled through the use of messages as utilized in postage meters.

It is a still further object of the present invention to provide a general program in which the actions of the firmware may be changed for a particular application based on information stored in the meter.

It is a still further object of the present invention to provide means for changing the information stored in the meter by means of messages communicated from an external source or by keyboard action.

It is a still further object of the present invention to provide means for changing certain information within the postage meter after the meter has been fully assembled.

It is a still further object of the present invention to provide a firmware controlled electronic postage meter for various postal systems in which programming costs and inventory costs are minimized.

Briefly, in accordance with the present invention, a method and associated apparatus for modifying a firmware variable in an electronic postage meter is provided comprising the steps of storing a program for operation of the electronic postage meter in the non-volatile memory, providing data external to the stored program which data is capable of modifying a variable in the program to change the action of the program, and accessing the non-volatile memory during operation of the electronic postage meter to change the action of the program in accordance with the presence of the external data or parameter indication or value.

A typical postage meter that could utilize the abovedescribed invention is described in U.S. Pat. No. 4,301,507 entitled Electronic Postage Meter Having Plural Computing System issued on Nov. 17, 1981 issued in the names of John H. Soderberg, Alton B. Eckert and Robert B. McFiggans. Changing the firmware variables or parameters within a meter if this kind permits customization of the meter after assembly to meet requirements of the various world post offices.

Other objects, aspects and advantages of the present invention will be apparent from the detailed description considered in conjunction with the preferred embodiment of the invention illustrated in the drawings, as follows:

DETAILED DESCRIPTION

Figure 1:
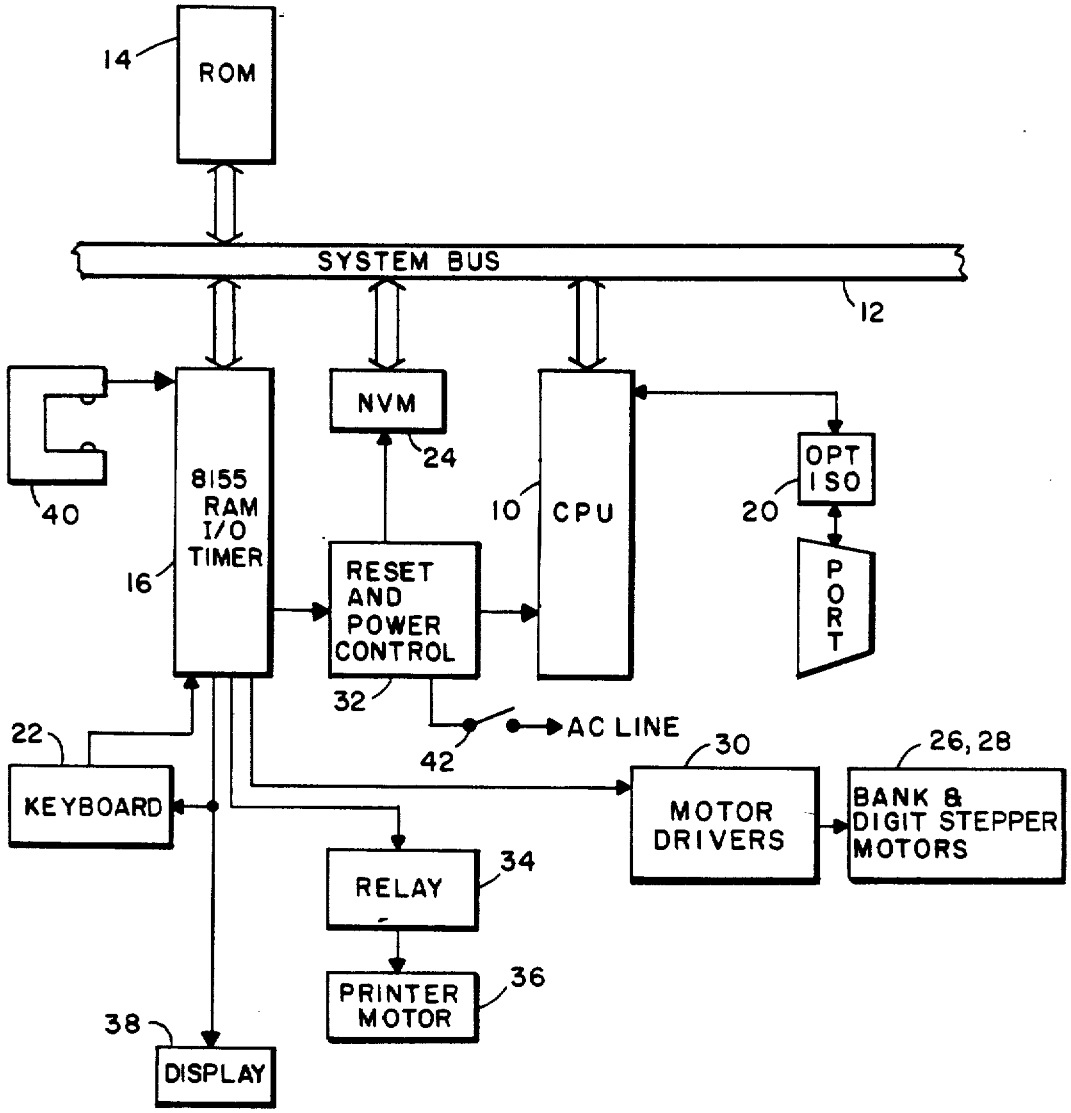
FIG. 1 is a block diagram of the generalized electronic circuitry of an electronic postage meter.

Referring to FIG. 1, the electronic postage meter includes an 8-bit microprocessor 10 (CPU), such as an Intel Model 8085A microprocessor which is connected to various components through a system bus 12. ROM 14 is connected to the microprocessor 10 through the system bus 12. The ROM 14 stores the programs for controlling the postage meter. It should be understood that the term ROM as used herein includes permanently programmed and reprogrammable devices. An integrated circuit 16, which may be Intel Model 8155, is connected to the system bus 12 and includes RAM, input and output lines and a timer. The RAM portion of the intergrated circuit 16 has memory space allocated for transient storage of the data for the ascending register and descending register.

An external data communication port 18 is connected to the microprocessor 10 through optical isolator 20. The external data communication port 18 allows connection with devices such as an electronic scale, an external computer, servicing equipment and the like. Also electrically connected to the microprocessor 10 through the system bus 12 is the keyboard 22 of the postage meter and a non-volatile memory (NVM) 24. Stepper motors 26, 28 are also in electrical connection with the microprocessor 10 via motor drivers 30 and the integrated circuit 16. A reset and power control 32 is electrically connected between the integrated circuit 16, the NVM 24 and the microprocessor 10. A relay 34 connects the AC printer motor 36 to the integrated circuit 16. A display 38 is also electrically connected to the integrated circuit 16. Trip photosensor 40 is connected to the microprocessor 10 through integrated circuit 16 to indicate the presence of an envelope to be stamped, as described more fully in the aforementioned patent application entitled, STAND-ALONE ELECTRONIC MAILING MACHINE.

The electronic postage meter is controlled by the microprocessor 10 operating under control of the programs stored in the ROM 14. The microprocessor 10 accepts information entered via the keyboard 22 or via the external communication port 18 from external message generators. Critical accounting data and other important information is stored in the non-volatile memory 24.

The non-volatile memory 24 may be an MNOS semiconductor type memory, a battery augmented CMOS memory, core memory, or other suitable non-volatile memory component. The non-volatile memory 24 stores critical postage meter data during periods when power is not applied to the postage meter. This data includes in addition to the serial number of the mailing machine or postage meter information as to the value in the descending register (the amount of postage available for printing), the value in the ascending register (the total amount of postage printed by the meters, and the value in the piece count register (the total number of cycles the meter has performed), as well as other types of data, such as trip status, initialization and service information, which are desired to be retained in the memory even though no power is applied to the meter.

When an on/off power switch 42 is turned on (closed) a power supply internal to the mailing machine energizes the microprocessor 10 and the balance of the electronic components. The information stored in the non-volatile memory 24 is transferred via the microprocessor 10 to the RAM of the integrated circuit 16. After power up the RAM contains an image or copy of the information stored in the non-volatile memory 24 prior to energization. During operation of the postage meter, certain of the data in the RAM is modified. Accordingly, when postage is printed, the descending register will be reduced by the value of the printed postage, the ascending register increased by the value of the printed postage and the piece counter register incremented. When the power switch 42 is turned off (opened), the updated data in the RAM is transferred via the microprocessor 10 back into a suitably prepared area of the non-volatile memory 24. A like transfer of information between the non-volatile memory 24 and the RAM takes place during power failure.

Figure 2A:
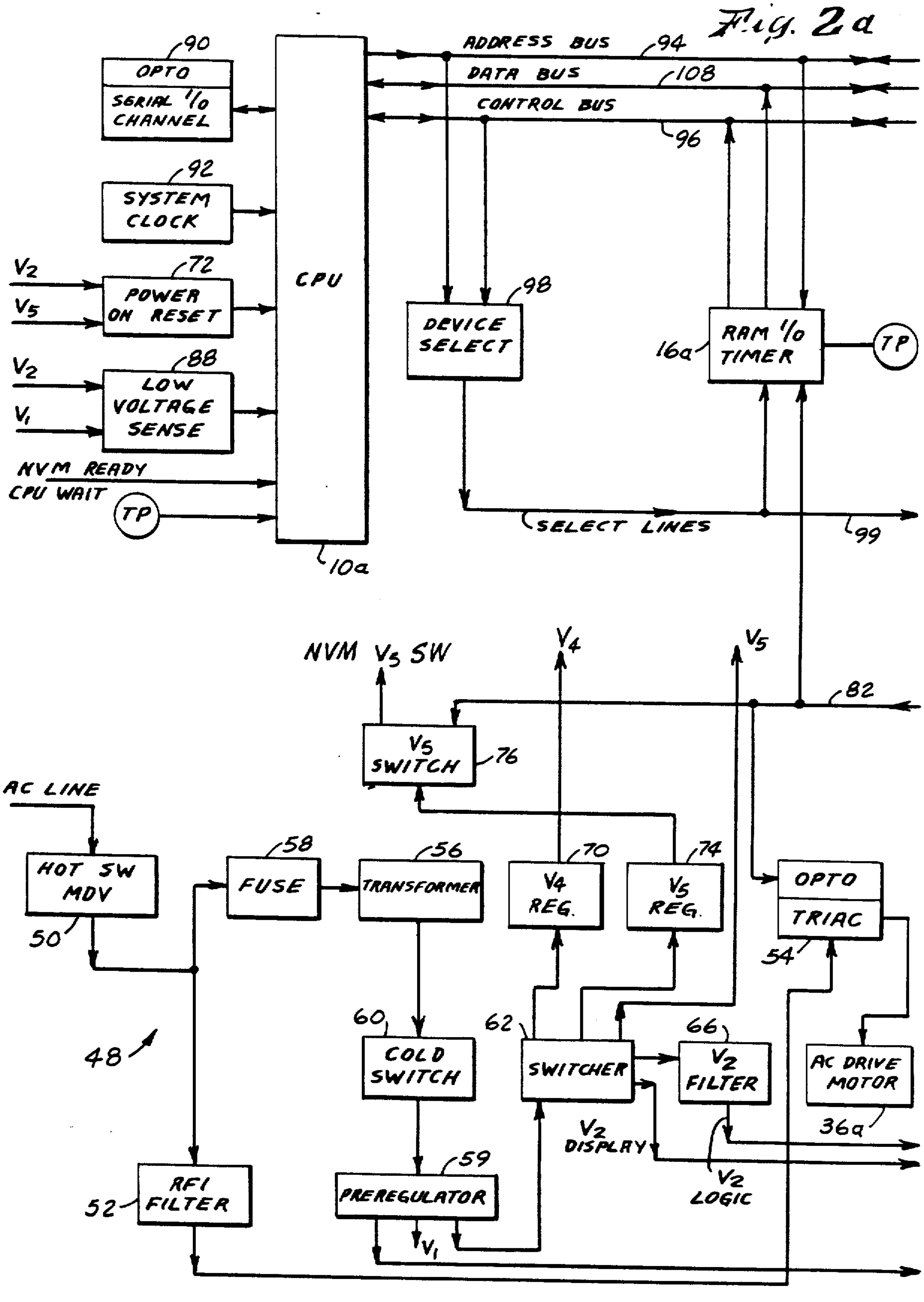
FIGS. 2A and 2B are a detailed block diagram of the electronic circuitry of the electronic postage meter.
Figure 2B:
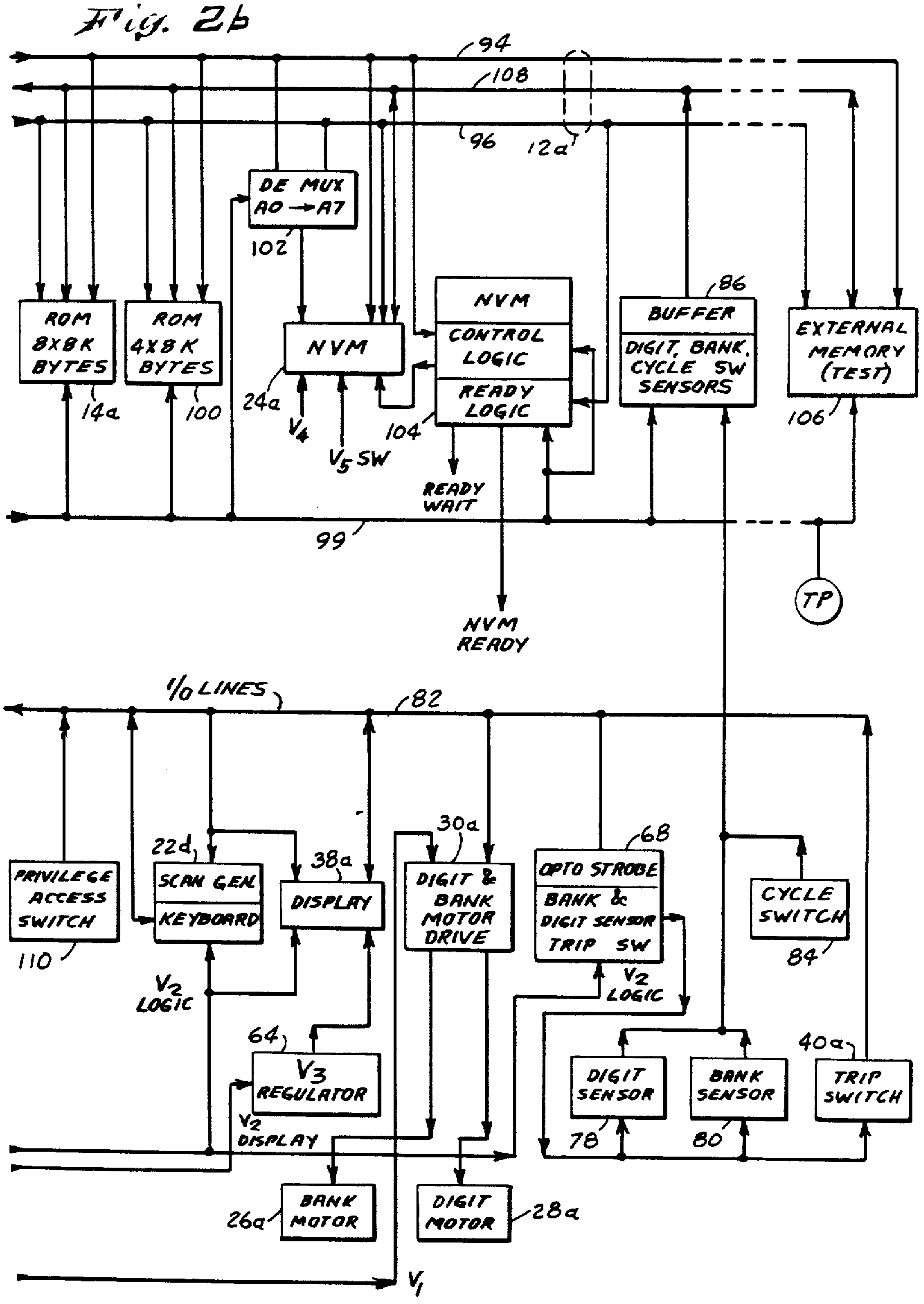

Referring to FIG. 2, a more detailed block diagram of the arrangement of the electrical components for the postage meter is illustrated generally as 48. Power is supplied to the postage meter from the AC line voltage, typically 115 volts. This line voltage is applied to the meter through a hot switch 50 which cuts off power to the postage meter to protect the electrical components thereof if the temperature rises above a preset limit, nominally 700° C. The hot switch 50 is connected to the AC drive motor 36A through an RF filter 52 and an opto-triac 54 which provides isolation between the line voltage and the control logic for the meter. The hot switch 50 is also connected to transformer 56 protected by a fuse 58.

The output of the transformer 56 is coupled to a preregulator 59 through a cold switch 60. The cold switch 60 cuts off power to the pre-regulator 59 if the temperature drops below a preset limit, nominally 0°. The pre-regulator 59 provides an output voltage of a predetermined range to a switcher 62 which generates the output voltage +5 V; and the voltages for generating −12 V and −30 V.

The +5V is applied to a +3 volt regulator 64 and then to the display 38A. The +5V from the switcher 62 is also applied to a+5V filter 66 which provides +5V for logic circuits. Specifically, the +5V is applied to the keyboard 22A, the display 38A, and bank, digit and trip sensor logic 68 and to the integrated circuits. The −12V is applied to a −12V regulator 70 and then to the non-volatile memory 24A.

The −30V output from the switcher 62 is also applied to a −30V regulator 74 and then to a −30V switch 76 which switches its output voltage on and off in response to the requirements of writing in NVM as dictated by the program. The output of the −30V switch is applied to the non-volatile memory 24A. The −30V supply is connected to the power on reset 72 of the microprocessor 10A.

+5V from the switcher 62 is also supplied to one input of the power on reset 72; the other input receives −30V from the regulator 74 as previously described. A low voltage sensor 88 also receives one input of +5V from the switcher 62 and its other input from the preregulator 59; its output is applied to the microprocessor 10A. The low voltage sensor 88 detects power failure and communicates this to the microprocessor 10A which in turn addresses the RAM through system bus 12A to transfer all security data present in the RAM to the non-volatile memory 24A.

Another output from the pre-regulator 59 in the form of +24V is applied to the digit and bank motor drive 30A for the bank motor 26A and digit motor 28A, which selects the particular printing wheel (bank)

which is to be activated and the particular digit of the selected printing wheel which is to be set.

An output strobe from the integrated circuit 16A is buffered through buffer driver 68 and applied to digit sensor (encoder 78, bank sensor (encoder) 80, and trip sensor 40A. The opto strobe applies power to the digit sensor 78, bank sensor 80 and trip sensor 40A when needed. The output from the trip sensor 40A is applied to the input/output lines 82 which are coupled to the integrated circuit 16A. The outputs from the digit sensor 78 and bank sensor 80 and cycle switch 84 are applied to a storage buffer 86.

During power up, the key switch 42, see FIG. 1, is closed, and the AC line voltage energizes the electrical components previously described and an Initialization process will occur.

Such initialization may include a hard and/or soft initialization process as disclosed in the aforementioned U.S. Pat. No. 4,301,507. Preferably the Intialization process is that described in copending application Ser. No. 695,027, filed herewith in the name of Easwaran C. N. Nambudiri entitled, INITIALIZING THE PRINT WHEELS IN AN ELECTRONIC POSTAGE METER, and assigned to the same assignee as the present invention.

In operation, the microprocessor 10A under control of the ROM 14A and possibly the auxiliary ROM 100 communicates over the address bus 94 and control bus 98 with the device select 98. The ouput of the device select 98 communicates with the particular module to be addressed over select lines 99. The modules to be addressed are the RAM, the ROM 14A, an auxiliary ROM 100, a demultiplexer 102, NVM logic 104 and the buffer 86. The RAM of integrated circuit 16A provides the working memory for the postage meter and the microprocessor 10A. The ROM 14A stores the program; the auxiliary ROM 100 may be used to provide additional program storage space. The non-volatile memory 24A provides storage of all security information for the meter and retains such information during power down or power failure. The demultiplexer 102 latches the lower eight (8) bits of address information that defines a particular location which is used immediately thereafter. The NVM logic 104 controls the mode of operation of the NVM 24A and also provides ready wait and NVM ready signals to the microprocessor 10A to indicate the presence of the slow speed device (NVM) as active on the bus 12A.

As previously mentioned, the digital sensor 78 (optical encoder) and bank sensor 80, (optical encoder) and cycle switch 84 whose current state is read, i.e., "Home" or "In Cycle", apply input signals to the buffer 86 which sends output signals over data bus 108 to the microprocessor 10A for storage in the proper RAM location.

The RAM is also electrically coupled to I/O lines to transmit or receive data from the trip sensor 40A, the display 38A, keyboard 22A, and privilege access switch 110, if present. The privilege access switch 110 may be used in applications which require manual resetting of meter postage via a switch which is kept under seal.

The flow chart discussed below indicates how one of a group of headers that enter the postal meter from an external source can be utilized to insert data into the non-volatile memory of the postal meter. The data therefor reconfigures that particular parameter of the meter to a particular country's specifications. The data inserted into the non-volatile memory becomes a permanent part of the postage meter when the meter is locked and sent out to the field. It should be understood that in this application whenever the terms firmware is used it is used to include software.

The ability to change the contents of the non-volatile memory of the postage meter prior to sending the meter to the postal authority but after the meter is fully assembled is very important. It is important because different countries have different rules and regulations governing the operation of postage meters. Thus, because of the different monetary systems utilized in various countries, the meters must have different firmware variables or parameters set into them. For example, some countries may have a decimal point to the right of one digit in the postal amount, where another country may have a postal amount that has three digits to the right of the decimal point. It is important therefor that a postage meter be developed that takes into account the fact that countries have various ways of printing a postage amount and a postage meter should be adaptable to those various ways.

In addition, there may be particular regulations like, for example, such as the number of pieces that can be included within the batch count, ascending register amount, descending register amount, or piece count, that may be required to be inserted in the postage meter prior to shipment to the postal authority or consumer within that particular country. Thus, it is well understood that it is important to have a postage meter that can be readily adaptable to the various situations encountered in postal facilities and postal regulations throughout the world.

It is the purpose of this invention to change the firmware variables or parameters in the NVM prior to the serial number being locked into the NVM. This is done by sending a message with a header, format and data to the meter from either the external world or from keyboard action (which formulates a message). The header will designate which action is to be taken, that is, it will provide the information as to which parameter must be changed for the particular meter. The format provides decimal point formatting information, and the data will provide data (either binary indicators, numeral digits or masks) to be placed into the NVM at certain locations which will be predescribed by header information. The flow chart of FIG. 3 describes the operation of Applicant's invention in relationship to changing a particular parameter in the NVM of the postage meter. It should be well recognized by those skilled in the art that there are a variety of parameters that can be changed and that change will be within the spirit and scope of Applicant's invention.

Figure 3:
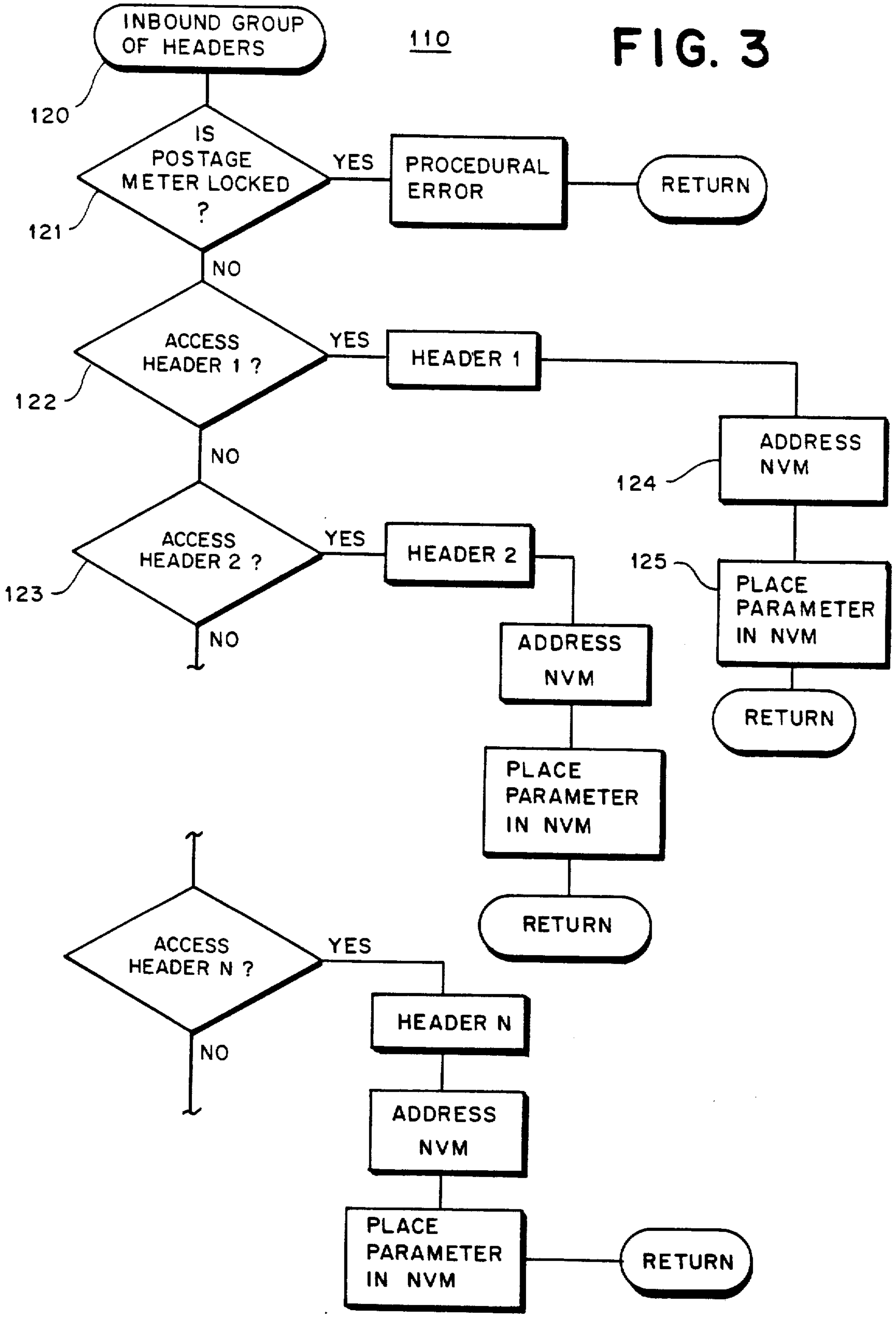
FIG. 3 is a flowchart for Header Conversion illustrating the present invention.

Specifically, referring to the flow chart illustrated as 110 in FIG. 3 for an Header Message Conversion, i.e., postage is entered from a keyboard or some other external source. Each word of a message is 10 bits long, each word includes a start bit followed by an 8 bit word, or byte, and terminating with a stop bit. The bits of the first word are specific message identification bits. If a message has more than one word, the second word of the message may contain a format byte, consisting of two nibbles, i.e., four-bit groups.

The first nibble represents the number of nibbles of data in the message, and the second nibble represents the number of digits to the right of the decimal point of the data, or corresponds to a hexadecimal F if no decimal point is indicated. The remainder of the words in the message are BCD data organized in nibble groupings. The last stop bit of a message, has a sense opposite to that of all other stop bits of the message, in order to indicate the end of the message. A family or group of headers are utilized in this embodiment to provide the data to the meter to change the variable information located therein. The particular header chosen is utilized to change a parameter at a particular location within the non-volatile memory (NVM) of the postage meter.

Referring to the flow chart of FIG. 3, a group or family of headers 120 is sent into a program located within in the ROM. The program will thereafter check to see if the postage meter is locked (decision box 121). If the meter is locked (that is, it is ready to be placed in the field) the program transmits a Procedural Error (box 130) and returns the meter to its normal operation as illustrated in the flow chart (Return). If the meter is not locked, then decision box 122 is entered into to determine whether that particular header is to be accessed.

There can be any number of headers that could be accessed as indicated by Header 1 to Header N. Thus, if a parameter is to be changed corresponding to Header 1, then data from decision box 122 will then be transferred to the Header 1 block, if not then the next decision box 23 will be accessed to determine if that is the parameter to be modified. In this embodiment this process would continue until the appropriate header was accessed to change the particular parameter of the meter.

Thus, if Header 1 is accessed, then the non-volatile memory will be addressed block 124 and the parameter will thereafter be placed in the NVM (block 125). After the parameter is placed in the NVM, then the meter is returned to its original operation. Through the use of this invention, the parameters of a postage meter can be changed on a customized basis after the meter has been fully assembled. Thus a postage meter can be assembled and the firmware can be modified in accordance with a particular customer's or country's specification. The ability to change the firmware after assembly allows for a meter manufacturer to produce the base postage meter which could be utilized in a variety of applications or countries.

There are many parameters of the postage meter that could be modified utilizing the above-described invention within the non-volatile memory which could be modified:(1) the type of resetting, (2) the type of meter, (3) the minimum recharge increment, (4) the maximum dollar amount into meter, (5) the ascending register preset, (6) the fixed increment amount, (7) the decimal default, (8) the number of digits to right of decimal point, (9) the number of fixed zeros, (10) the ascending register size (displayed), (11) the descending register size (displayed), (12) special instruction bits, i.e., foreign country bit, and (13) type of monetary lock out.

It is known and understood for the purpose of the present application that the term postage meter refers to the general class of device for the imprinting of a defined unit value for governmental or private carrier delivery of parcels, envelopes or other like application for unit value printing. Thus, although the term postage meter is utilized, it is both known and employed in the trade as a general term for devices utilized in conjunction with services other than those exclusively employed by governmental postage and tax services. For example, private, parcel and freight services purchase and employ such meters as a means to provide unit value printing and accounting for individual parcels.

It should be apparent to those skilled in the art that various modifications may be made in the present invention without departing from the spirit and scope thereof as described in the specification and defined in the appended claims.

What is claimed is:

1. A method for modifying a firmware variable in an electronic postage meter, comprising the steps of:
   - storing a program for operation of the electronic postage meter;
   - providing data in non-volatile memory external to the stored program which data is capable of modifying a variable in the program to change the action of the program; and
   - accessing such external data during operation of the electronic postage meter to change the action of the program in accordance with the presence of the external data.

2. The method recited in claim 1, wherein:
   - the program is stored in at least one ROM.

3. The method recited in claim 1, wherein:
   - providing the data allows modification of the actions of the program to set decimal point position.

4. The method of claim 1 further comprising the step of inputting data to non-volatile memory through a message generating means.

5. A method for modifying a firmware variable in an electronic postage meter, comprising the steps of:
   - storing a program for operation of the electronic postage meter in at least one ROM;
   - setting data in non-volatile-memory external to the stored program; and modifying a variable in the firmware in accordance with the external data.

6. Apparatus for modifying a firmware variable in an electronic postage meter, comprising:
   - ROM means for storing a program for the electronic postage meter;
   - non-volatile memory means;
   - data for changing the actions of a firmware variable stored in said non-volatile memory means; and
   - means interconnecting said ROM means and said non-volatile memory means for providing communication there between to access said data and change the actions of the firmware in accordance with the presence of said data in said non-volatile memory means.

7. The apparatus recited in claim 6, wherein:
   - said interconnecting means includes a system bus and a microprocessor.

8. The apparatus recited in claim 6, wherein:
   - the presence of said data in said non-volatile memory means provides for the setting of decimal point position.

9. Apparatus for modifying a firmware variable in an electronic postage meter, comprising:
   - ROM means for storing a program for the electronic postage meter;
   - a non-volatile memory;
   - said non-volatile memory having stored therein data for changing the actions of the firmware;
   - interconnecting means including a microprocessor and a system bus for interconnecting said ROM means and said non-volatile memory for providing communication therebetween to access said data stored in said non-volatile memory and the firmware to change the actions of the firmware in accordance with the presence of said data in said non-volatile memory, the presence of said data in said non-volatile memory resulting in the setting of decimal point position.

10. The apparatus recited in claim 9 including:

other data set in said non-volatile memory for modifying said data for changing the code sequence of the stored program.

11. The apparatus of claim 9 further comprising message generating means for inputting the data into non-volatile memory.

12. The apparatus of claim 11 wherein the message generating means includes a keyboard.

* * * * *